(12) United States Patent
Jin

(10) Patent No.: US 6,658,045 B1
(45) Date of Patent: Dec. 2, 2003

(54) CDMA COMMUNICATIONS SYSTEM ADAPTIVE TO MOBILE UNIT SPEED

(75) Inventor: Xin Jin, Nepean (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/253,094

(22) Filed: Feb. 22, 1999

(51) Int. Cl.[7] .............................. H04B 1/69; H04B 1/707
(52) U.S. Cl. ....................................... 375/147; 375/141
(58) Field of Search ................................ 375/130, 140, 375/141, 146, 147, 219; 455/522, 230, 238.1, 441; 702/142

(56) References Cited

U.S. PATENT DOCUMENTS

| | | | |
|---|---|---|---|
| 5,103,459 A | | 4/1992 | Gilhousen et al. .............. 375/1 |
| 5,109,390 A | | 4/1992 | Gilhousen et al. .............. 375/1 |
| 5,267,261 A | | 11/1993 | Blakeney, II et al. ........... 375/1 |
| 5,396,645 A | * | 3/1995 | Huff .......................... 455/441 |
| 5,442,627 A | | 8/1995 | Viterbi et al. ................. 370/22 |
| 5,453,715 A | * | 9/1995 | Lee ............................ 329/302 |
| 5,471,497 A | * | 11/1995 | Zehavi ........................ 375/142 |
| 5,513,221 A | * | 4/1996 | Parr et al. .................... 375/344 |
| 5,585,805 A | * | 12/1996 | Takenaka et al. ............. 342/461 |
| 5,771,461 A | * | 6/1998 | Love et al. ................... 455/522 |
| 5,903,596 A | * | 5/1999 | Nakano ....................... 375/150 |
| 6,249,682 B1 | * | 6/2001 | Kubo et al. .................. 455/522 |
| 6,373,882 B1 | * | 4/2002 | Atarius et al. ............... 375/148 |
| 6,377,813 B1 | * | 4/2002 | Kansakoski et al. ......... 455/522 |

* cited by examiner

Primary Examiner—Stephen Chin
Assistant Examiner—David B. Lugo

(57) ABSTRACT

The invention is a CDMA system which achieves improved performance by virtue of being adaptive to the speed of each mobile unit in the system. A speed estimator for each mobile unit can be located in the mobile unit itself and/or in the base station. The speed estimate is used to modify a variety of parameters within processing fingers in the mobile unit and in the base station, including the accumulation period of certain accumulators and the time constant for loop filters. The speed estimate also influences assignment, by a control unit, of path delays to respective processing fingers for despreading. Furthermore, the speed estimate is used by the control unit to decide whether or not finger outputs are to be combined by a diversity combiner in the receiver. In addition, the speed estimate is used to optimize the closed-loop power control target and the energy of a transmitted pilot. The speed estimate is also used for allocation of pooled finger and searcher resources, as well as data transmission rate negotiation and interleaver/deinterleaver length configuration.

27 Claims, 5 Drawing Sheets

CDMA COMMUNICATIONS SYSTEM ADAPTIVE TO MOBILE UNIT SPEED

FIELD OF THE INVENTION

The present invention relates to wireless communications systems and, in particular, to methods and apparatus of improving the performance of a CDMA communications system in which a base station communicates with moving mobile units.

BACKGROUND OF THE INVENTION

The widespread deployment of wireless cellular communications systems can be attributed to an explosion in the public's demand for high user mobility, coupled with advances in technology allowing multiple users to share a common frequency band virtually without interfering with one another. One widely used multiple-access technique, known as code-division multiple-access or CDMA, has been shown to exhibit superior performance with respect to many other multiple-access techniques in terms of countering the effects of multipath fading and mutual interference.

Many implementations of CDMA in use today are based on TIA/EIA standard IS-95, which is incorporated by reference herein. Some basic principles of IS-95 CDMA are explained in greater detail in several U.S. Patents, among which U.S. Pat. Nos. 5,109,390 and 5,103,459 (both to Gilhousen et al.) are particularly noteworthy and are incorporated by reference herein. In the years to come it is expected that a large number of industry leaders will adopt an improved flavour of CDMA, known to practitioners in the field as third generation (or "3G") CDMA. In accordance with various proposals being made by numerous groups working to standardize it, 3G CDMA would be similar to IS-95 CDMA but would provide additional desirable features such as a reverse-link pilot channel, data transmission rate negotiation and support for mobile unit speeds up to 500 km/h. An example of a 3G CDMA proposal is an International Telecommunications Union (ITU) document entitled "cdma2000 RTT Candidate Submission to US TG8/1", which is incorporated by reference herein.

It is known that motion of a mobile unit may cause degradation in the performance of a CDMA receiver, both at the base station and at the mobile unit. For example, under multipath conditions, motion of the mobile unit relative to the base station and numerous signal scattering objects will cause the phase and strength of the corresponding received multipath signals to vary with time, resulting in a Doppler spread of the original signal. This makes it difficult for the receiver to estimate and/or track the channel phase and estimate the channel state information (CSI), particularly at high speeds.

Other effects of the speed of the mobile unit include a reduced lifetime of the individual multipath paths at high speeds (requiring fast finger acquisition), quickly varying multipath delays at high speeds (making tracking of the corresponding multipath paths more difficult for the receiver), as well as longer error bursts at low speeds (rendering error randomization more difficult for the deinterleaver at the receiver).

The approach taken by both IS-95 CDMA and the various 3G proposals in order to improve the immunity of CDMA signals to multipath fading and interference depends on the speed range which is to be supported. For instance, a closed loop power control scheme can be used to improve performance of a CDMA receiver at low speeds, while interleaving and coding tends to improve performance at high speeds. Because many effects of the Doppler spread are more pronounced at high speeds, conventional CDMA receivers are usually designed to achieve a certain performance measure at a predetermined maximum speed, e.g., 200 km/h for a receiver operating in the 1.9 GHz band.

Once the maximum supported speed is chosen, many other system parameters, such as the details of the finger assignment algorithm and the length of various accumulators in the receiver, are then optimized to meet the specific requirements for the maximum supported speed. However, the selection of these system parameters as a function of the "worst case scenario" usually results in impaired performance at speeds both lower and higher than the speed chosen for optimization. This becomes a more severe issue as 3G mobile communications systems target a wider range of mobile unit speeds, up to a maximum of approximately 500 km/h.

Degraded receiver performance then leads to other deleterious effects, such as a reduction in the system capacity and a shorter life span for the mobile unit battery.

SUMMARY OF THE INVENTION

It is an object of the present invention to mitigate or obviate one or more disadvantages of the prior art.

According to one broad aspect, the invention is intended for use in a communications system wherein a base station communicates CDMA signals with a plurality of mobile units and can be summarized broadly as a method of processing the CDMA signals communicated between the base station and each mobile unit as a function of an estimate of the speed of the respective mobile unit.

According to another broad aspect, the invention can be summarized as a communications device comprising processing fingers which adapt their processing parameters as a function of an estimate of the speed of the mobile unit. The invention can be summarized according to further broad aspects as the individual components of a processing finger in the communications device, such as the PN code despreader, the phase estimator and the CSI estimator, each of which adapts its processing parameters as a function of an estimate of the speed of the mobile unit.

In a communications system wherein a base station communicates CDMA signals with a plurality of mobile units, the invention may be summarized broadly as a method of processing the CDMA signals communicated between the base station and each mobile unit as a function of an estimate of the speed of the respective mobile unit.

The invention may summarized according to another broad aspect as a method of varing the transmission rate of signals communicated between the base station and each mobile unit as a function of an estimate of the speed of the respective mobile unit.

In a communications system wherein a base station communicates CDMA signals with a plurality of mobile units and wherein the signals communicated in either direction between the base station and each mobile unit have a respective power level, the invention may be summarized according to a further broad aspect as a method of varying the power level of the signals as a function of an estimate of the speed of the respective mobile unit.

At a system level, involving both base station and mobile station, the invention can be summarized according to a further broad aspect as a method of adjusting, individually or in combination, the transmitted power, the relative power of the pilot channel, the data transmission rate and the interleaver/deinterleaver length as a function of an estimate of each mobile unit's speed.

Moreover, the invention can be summarized according to still another broad aspect as a speed estimator for estimating the speed of a mobile unit. Different speed estimators are used, depending on whether or not a pilot channel is present and whether or not orthogonal modulation has been employed at the transmitter.

A speed estimator in accordance with the invention can be located at the base station but can be used for adapting parameters at the base station and/or at the mobile unit. Similarly, a speed estimator can be located at a mobile unit, but can be used for adapting parameters at the base station or at the mobile unit itself.

BRIEF DESCRIPTION OF THE DRAWINGS

The preferred embodiment of the present invention will now be described with reference to the accompanying figures, in which.

DETAILED DESCRIPTION OF THE PREFERRED EMBODIMENT

In a CDMA system to which the present invention applies, base stations are each considered to service mobile units roaming in an entire cell, although it should be understood that a cell may be geographically divided into sectors with each sector treated as a different coverage area. A system controller and switch provides system control to the base stations and also controls the routing of telephone calls from the public switched telephone network (PSTN) to the appropriate base station for transmission to the appropriate mobile unit. The controller further controls the routing of calls from the mobile units, via at least one base station, to the PSTN. The controller may be coupled to the base stations by various means such as dedicated telephone lines, optical fiber links or microwave communication links, while the link between a base station and a mobile unit is of the wireless nature.

Figure 1:
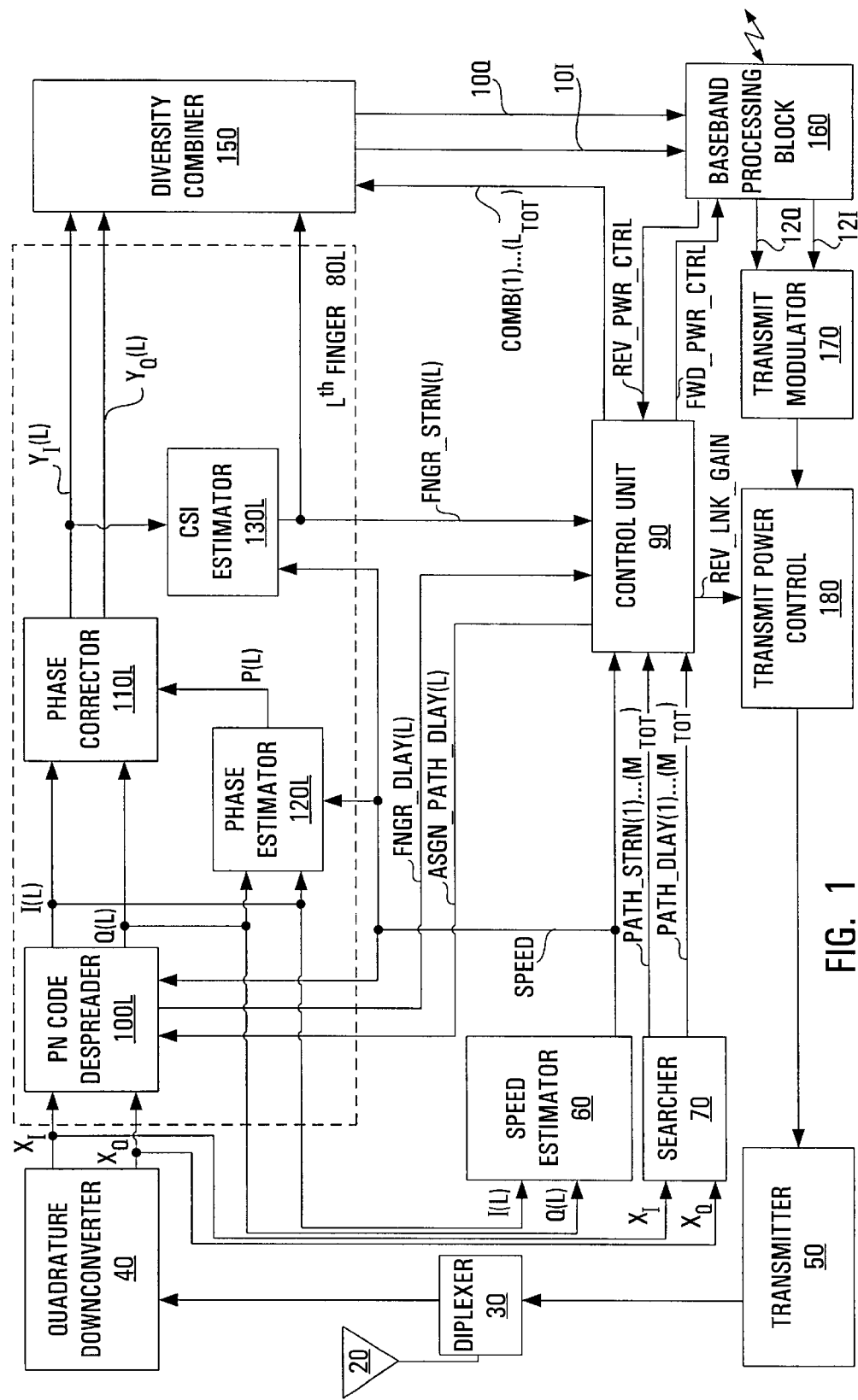
FIG. 1 is a block diagram of a mobile unit in accordance with one embodiment of the present invention.

FIG. 1 illustrates in block diagram form a mobile unit in accordance with the present invention. The mobile unit comprises an antenna 20 which is coupled through a diplexer 30 to a quadrature downconverter 40 and a transmitter 50. The antenna 20 and diplexer 30 are of standard design and permit simultaneous transmission and reception through a single antenna. The antenna 20 collects CDMA signals transmitted by one or more base stations and provides them through the diplexer 30 to the quadrature downconverter 40.

In accordance with IS-95 or 3G CDMA, the CDMA signals provided to the quadrature downconverter 40 will comprise, for each base station within range, a pilot channel, a plurality of traffic channels and possibly a number of control channels, all of which may be corrupted by multipath dispersion. Typically, only the pilot channel, control channels (if present) and a subset of at least one among all traffic channels corresponding to a single base station are intended for the mobile unit in question.

The signal fed to the quadrature downconverter 40 by the diplexer 30 is a radio-frequency signal (typically in the 850 MHz or 1900 MHz frequency band). The quadrature downconverter comprises circuitry for amplification, downconversion to an IF frequency, quadrature demodulation to baseband, filtering, sampling and analog-to-digital (A/D) conversion of the signal to produce an in-phase sample stream $X_I$ and a quadrature sample stream $X_Q$, both of which lead to a searcher 70 and to each of $L_{TOT}$ processing fingers; for clarity, only finger 80L is shown in FIG. 1. The downconversion process may be accomplished using a frequency synthesizer of standard design which permits the quadrature downconverter 40 to be tuned to any of the frequencies within a receive frequency band of the overall cellular telephone frequency band.

The searcher 70 is a commonly used component that is described in numerous publications, including the two aforementioned U.S. Patents, and as such its detailed construction need not be described herein. Functionally, the searcher 70 identifies the $M_{TOT}$ strongest multipath path delays embedded in the in-phase and quadrature sample streams $X_I$ and $X_Q$, as well as their corresponding strengths. The delay of the Mth path is denoted PATH_DLAY(M) and its strength is denoted PATH_STRN(M). The resolution among the path delays is within 1 chip period (e.g., 0.5 chip period). Both the set of $M_{TOT}$ path delays and $M_{TOT}$ path strengths are output by the searcher 70 to a control unit 90.

Structurally, the control unit 90 may consist of a programmable microprocessor, although it is suitably implemented as a programmable read-only memory (ROM), an application-specific integrated circuit (ASIC), a digital signal processing (DSP) chip or any type of programmable logic device (PLD). Operation of the control unit 90 shall be described in more detail further on. It should be understood that the parameters entering and exiting the control unit may be software parameters or may represent signals that are exchanged with other components of the receiver via physical signal lines.

The number of fingers, denoted $L_{TOT}$, corresponds to the maximum number of multipath paths (from a total of $M_{TOT}$ provided by the searcher 70) that can be tracked in the mobile unit. Each finger is identical in structure and therefore it is sufficient to consider only finger 80L in greater detail. With continued reference to FIG. 1, finger 80L is seen to comprise a PN code despreader 100L, a phase estimator 120L, a phase corrector 110L and a CSI (channel state information) estimator 130L.

The PN code despreader 100L has an input for accepting an estimate of the speed of the mobile unit, denoted SPEED, which is preferably supplied by a speed estimator 60 shared among all the fingers. However, it should be understood that the speed may be estimated at the base station and sent to the mobile unit via a control channel. In the latter case, the speed estimate would be decoded at a baseband processing block 160 (to be described later), which would supply the SPEED parameter to the PN code despreader 100L and to other components of the mobile unit.

The PN code despreader 100L also accepts a parameter identified by ASGN_PATH_DLAY(L) from the control unit 90 indicating the approximate delay of the multipath path which it is assigned to track, measure and despread. Based on the values of ASGN_PATH_DLAY(L), SPEED and the in-phase and quadrature sample streams $X_I$ and $X_Q$ received from the quadrature downconverter 40, the PN code despreader 100L produces in-phase and quadrature despread sample streams I(L) and Q(L). In addition, the PN code despreader 100L outputs to the control unit 90 a parameter denoted FNGR_DLAY(L), which represents a more precise assessment (e.g., to within ⅛ of a chip period) of the multipath path delay being tracked and measured.

Figure 2:
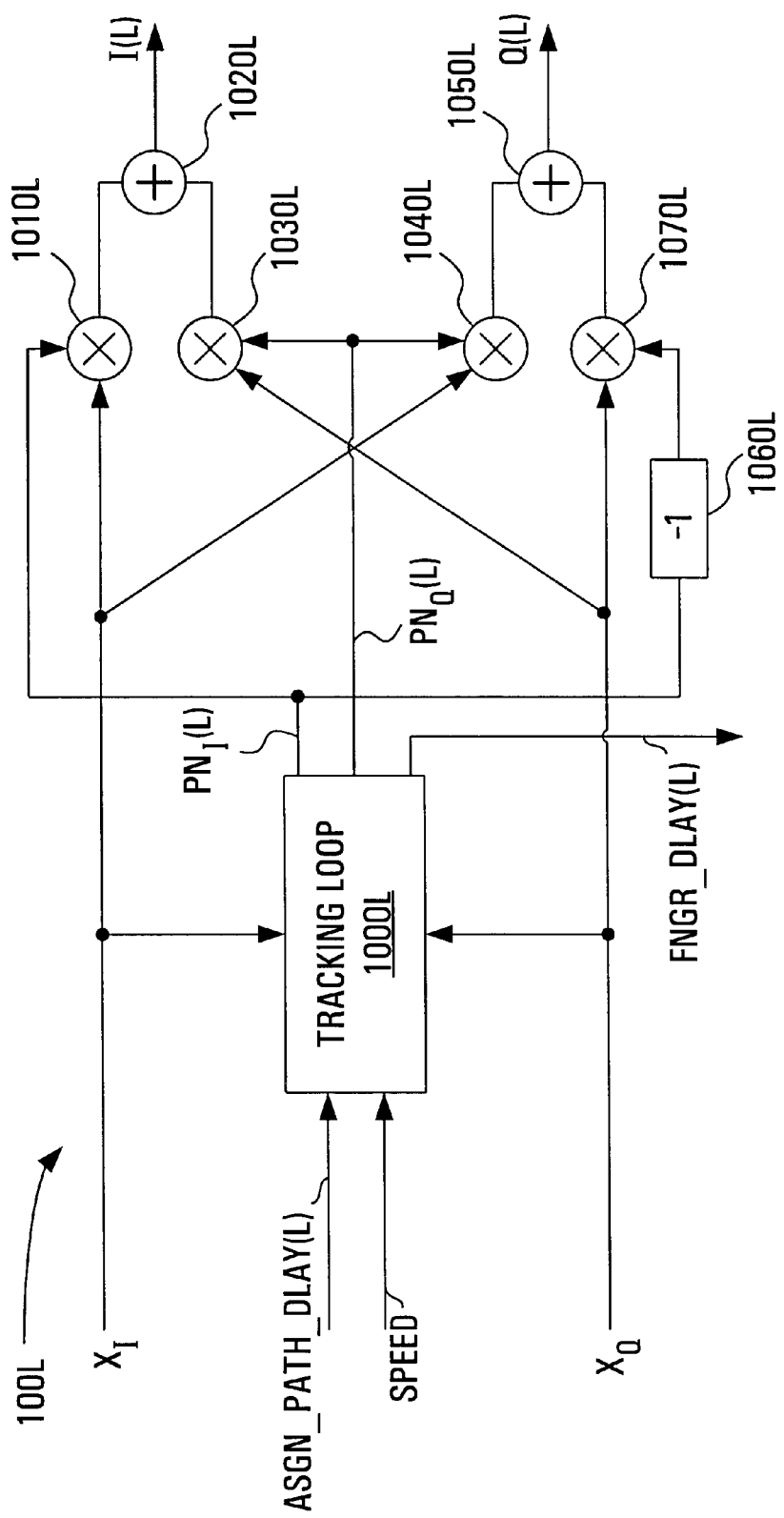
FIG. 2 is a block diagram of a PN code despreader forming part of the mobile unit of FIG. 1.

The preferred embodiment of the PN code despreader 100L is shown in greater detail in FIG. 2. The PN code despreader 100L is seen to comprise a tracking loop 1000L which accepts the ASGN_PATH_DLAY(L) parameter from the control unit 90, the SPEED parameter from the speed estimator 60 (or from the baseband processing block 160) and the sample streams $X_I, X_Q$ from the quadrature downconverter 40. Based thereon, the tracking loop 1000L produces two pseudonoise sequences $PN_I(L), PN_Q(L)$, which are shifted versions of the in-phase PN code "$a_I$," and the quadrature PN code "$a_Q$" known to all the concerned base stations and mobile units in the CDMA system.

Still within the PN code despreader 100L, the sample streams $X_I, X_Q$ and the pseudonoise sequences $PN_I(L), PN_Q(L)$ are cross-modulated by a signal conditioning block, preferably consisting of an array of multipliers and adders. Specifically, as in the embodiment shown in FIG. 2, sample stream $X_I$ and pseudonoise sequence $PN_I(L)$ enter a multiplier 1010L, where they are multiplied and output to a first input of a summer 1020L. Sample stream $X_Q$ and pseudonoise sequence $PN_Q(L)$ enter another multiplier 1030L, whose output is connected to a second input of summer 1020L. The output of summer 1020L is a despread in-phase sample stream I(L).

Similarly, sample stream $X_I$ and pseudonoise sequence $PN_Q(L)$ enter a multiplier 1040L having an output connected to a first input of a summer 1050L. Also, sample stream $X_Q$ and pseudonoise sequence $PN_Q(L)$, after passing through an inverter 1060L, enter a multiplier 1070L, whose output is connected to a second input of summer 1050L. The output of summer 1050L is a despread quadrature sample stream denoted Q(L).

At the output of the PN code despreader 100L, the in-phase and quadrature despread sample streams I(L),Q(L) are simultaneously fed to the phase corrector 110L and to the phase estimator 120L. If the mobile unit is equipped with a speed estimator, as is the case in FIG. 1, then the in-phase and quadrature despread sample streams I(L),Q(L) are also fed to the speed estimator 60, of which the structure and operation will be described in more detail later on.

Continuing with the description of finger 80L, the phase estimator 120L accepts the SPEED parameter from the speed estimator 60 (or the baseband processing block 160) and the despread sample streams I(L),Q(L) from the PN code despreader 100L, and produces a complex signal P(L) whose phase is the phase amount needed for the phase correction and whose magnitude is a constant. Specifically, the phase estimator 120L consists of two accumulators placed in parallel, for respectively accumulating the despread sample streams I(L),Q(L) over a controllable accumulation period. The phase estimator 120L also comprises a value mapping means such as a look-up table, for adjusting the accumulation period of the so-called "I" and "Q" accumulators in accordance with the value of the SPEED parameter, as well as a magnitude scaler to scale the magnitude to a constant.

The complex signal P(L) is fed to the phase corrector 110L, which comprises a conjugator and a complex multiplier. The phase corrector 110L produces output sample streams $Y_I(L) Y_Q(L)$ based on the despread sample streams I(L),Q(L) received from the PN code despreader 100L and on the complex signal P(L) received from the phase estimator 120L. Sample streams $Y_I(L)$ and $Y_Q(L)$ are then fed simultaneously to the CSI estimator 130L (within finger 80L) and to a diversity combiner 150 common to all fingers.

The CSI estimator 130L is also connected to receive the SPEED parameter from the speed estimator 60 (or the baseband processing block 160, as appropriate). The CSI estimator 130L essentially consists of a variable-length accumulator and a normalizer, for summing the sample stream $Y_I(L)$ and normalizing it according to the length of the accumulation period. The accumulation period is specifiable by the value of SPEED, and therefore the CSI estimator 130L comprises a value mapping means such as a look-up table, for determining the value of the accumulation period based on the value of SPEED. The output of the CSI estimator 130L, denoted FNGR_STRN(L), is a measurement of the actual strength of the multipath path being tracked by finger 80L and is fed both to the control unit 90 and to the diversity combiner 150.

Finger 80L just described is known as a "coherent" finger and is best suited to CDMA systems in which there is a pilot channel, such as the forward link in both IS-95 and 3G CDMA. Nevertheless, those skilled in the art will appreciate that non-coherent or pseudo-coherent reception techniques could be used and that the components of a non-coherent or pseudo-coherent finger could depend on the value of the SPEED parameter in a similar way to that just described with regard to coherent finger 80L, although such reception techniques are not required due to the presence of a pilot channel.

For each Lth finger from a total of $L_{TOT}$ fingers, the diversity combiner 150 (also known as a linear combiner) receives a respective binary-valued parameter denoted COMB(L) from the control unit 90. If the value of COMB(L) is equal to a "one", the diversity combiner 150 multiplies, or "weights", the sample streams $Y_I(L), Y_Q(L)$ by the value of FNGR_STRN(L). (It will later be shown how the control unit 90 generates a "one" for COMB(L) when the Lth finger is meant to be combined by the diversity combiner 150, and a "zero" otherwise.) The $L_{TOT}$ in-phase products are summed to yield an in-phase baseband sample stream 10I and the $L_{TOT}$ quadrature products are summed to yield a quadrature baseband sample stream 10Q, both of which are fed to the baseband processing block 160.

In an alternative embodiment, the CSI estimator 130L can be implemented as part of the phase estimator 120L, in which case the scaler in the phase estimator would be replaced by means for normalizing the gain of the accumulators. The complex signal P(L) fed to the phase corrector 110 would thus possess both the normalized magnitude and the phase. This obviates the need for feeding the FNGR_STRN(L) parameter to the diversity combiner 150, since the phase corrector 110L would apply both phase correction as well as weighting. The magnitude of the complex signal P(L) output by phase estimator 120L would then be used as the FNGR_STRN(L) parameter fed to the control unit 90.

The baseband processing block 160 comprises a forward-link portion, typically consisting of a Walsh orthogonal despreader, a deinterleaver, a symbol combiner and depuncturing facility (depending on the standard), a forward error correction (FEC) decoder and a cyclic redundancy check (CRC) block connected together in accordance with one of many known variations. The deinterleaver in the mobile unit reverses an interleaving operation performed by an interleaver at the base station, so that burst errors or burst noise corruption occurring in the channel are spread out more evenly at the output of the deinterleaver. (The interleaver is a block of memory that writes in one order, e.g., 1,2,3, . . . , and reads in another order, e.g., 1,25,49, . . . ) When random errors are more evenly distributed in this manner, such errors can be more efficiently corrected by the FEC decoder.

At the output of the baseband processing block 160 will emerge one or more data streams destined for the mobile unit. Some of the data streams may comprise voice or data traffic, while others may comprise control messages emitted by the base station. For each traffic channel carrying voice, the output of the baseband processing block 160 may be fed to a digital vocoder, which may be of the variable rate type. The vocoder output is then fed to a digital-to-analog (D/A) converter, which interfaces with the user via a handset. For traffic channels carrying data, the output of the baseband processing block 160 may be fed to processing modules for interpreting and/or displaying the data.

The control messages received from the base station may consist of power control messages and if this is the case, then the baseband processing block 160 will be equipped with a power control subchannel decoder for decoding these messages and sending them to the control unit 90 in the form of a REV_PWR_CTRL parameter. It should be understood that the speed of the mobile unit may be measured at the base station and transmitted to the mobile unit as a control message to the mobile unit. Consequently, the baseband processing block 160 may be equipped with a decoder for this purpose.

The baseband processing block 160 also comprises a reverse-link portion for accepting voice and data traffic channels from the user, and typically consists a CRC block, a FEC encoder, an interleaver and a channel spreader, among other components. The encoded and spread traffic channels are fed to a transmit modulator 170 in the form of an in-phase reverse-link baseband data stream 12I and a quadrature reverse-link data stream 12Q.

In addition, the baseband processing block 160 may comprise a power control subchannel encoder for encoding forward power control messages received from the control unit 90 via a parameter FWD_PWR_CTRL. Generation of the parameter FWD_PWR_CTRL by the control unit 90 is discussed later. The baseband processing block 160 may also comprise circuitry for generating a reverse-link pilot channel, which would not be used in IS-95 CDMA but which has been proposed for use in 3G CDMA.

Furthermore, if the SPEED parameter is estimated at the mobile unit by a speed estimator (as is the case in FIG. 1), then the baseband processing block would be connected to receive the SPEED parameter from the speed estimator and comprises signal processing circuitry or program code for embedding the SPEED parameter in a control message intended for the base station.

The transmit modulator 170 performs standard quadrature modulation on the reverse-link baseband data streams 12I,Q output by the baseband processing block 160. The output of the transmit modulator 170 is connected to a transmit power control block 180, which contains circuitry for modifying the power (amplitude) of the intended transmitted signal in accordance with a REV_LNK_GAIN parameter received from the control unit 90.

Transmit power control block 180 outputs the power controlled signal to the transmitter 50, which comprises circuitry for D/A conversion and upconversion of the intended transmitted signal to an RF frequency by mixing with a frequency synthesizer output signal. The intended transmitted signal is output from the power amplifier within the transmitter 50 to the diplexer 30, which couples the signal to antenna 20 for transmission to the base station.

In operation, the behaviour of the antenna 20, diplexer 30, quadrature downconverter 40, transmit modulator 170, transmit power control block 180 and transmitter 50 is sufficiently well known in the art and as such does not require extensive treatment.

The in-phase and quadrature sample streams $X_I, X_Q$ exiting the quadrature downconverter 40 contain the baseband components of the pilot channel and code channels destined for the mobile unit itself and for other mobile units, all of which may be corrupted by multipath dispersion. The role of each finger is to isolate, or "despread", the pilot channel and code channels destined for the mobile unit and associated with a distinct multipath path.

Specifically, with reference to FIG. 2, the tracking loop 1000L in PN code despreader 100L uses the value of ASGN_PATH_DLAY(L) as an initial estimate of the delay to be applied to the known pseudonoise sequences $a_I$, and $a_Q$, resulting in pseudonoise sequences $PN_I(L)$ and $PN_Q(L)$. The initial delay estimate is refined by processing with a delay-locked loop (DLL) requiring a loop filter within the tracking loop 1000L. In accordance with the present invention, the time constant of this filter is adjusted in accordance with the value of SPEED, preferably by means of a look-up table. The refined delay estimate is represented by the value of the FNGR_DLAY(L) parameter, which is fed back to the control unit 90. Once the assigned path has been acquired, the loop 1000L will autonomously continue to track and measure variations in the path delay path until the path disappears or the finger is reassigned to a new path.

Cross-multiplication of sample streams $X_I$ and $X_Q$ with (properly aligned) pseudonoise sequences $PN_I(L)$ and $PN_Q(L)$ in the manner illustrated in FIG. 2 results in despread sample streams I(L),Q(L) which are associated with a single multipath path. This procedure of extracting I(L) and Q(L) from $X_I$ and $X_Q$ enables further orthogonal despreading and accumulation of the traffic channel destined for the mobile unit, as performed by the baseband processing block 160 and resulting in a large so-called processing gain. The despread in-phase and quadrature sample streams X(L) and Q(L) are fed to the phase estimator 120L and phase corrector 110L, as well as to the speed estimator 60, if one is present in the mobile unit.

As was previously discussed, the phase estimator 120L accumulates the values of I(L) and Q(L) in respective "I" and "Q" accumulators which have an accumulation length that is a function of the value of SPEED. This function may be implicitly defined through a look-up table. The phase estimator 120L then outputs the complex phase estimate P(L) which is a complex signal represented by the accumulated values in the "I" and "Q" accumulators, scaled to have a modulus of unity.

At the phase corrector 110L, the complex sample streams I(L) and Q(L) are multiplied by the conjugate of the complex signal P(L), and therefore the phase corrector 110L changes the angle of the complex values whose real and imaginary components are represented by I(L) and Q(L), respectively, by an amount equal to the negative of the phase angle of complex signal P(L). The phase corrector 110L then outputs the real and imaginary portions of the result as sample streams $Y_I(L)$ and $Y_Q(L)$, which are intended to be combined with the sample streams output by other fingers at the diversity combiner 150.

At the CSI estimator 130L, sample stream $Y_I(L)$ is accumulated for a period determined by the look-up table as a function of the value of the SPEED parameter. The normalizer then divides the accumulated sum by the accumulation period and the output of the CSI estimator 130L, namely the FNGR_STRN(L) parameter, is subsequently fed to the control unit 90 and to the diversity combiner 150.

At the diversity combiner 150, the sample streams $Y_Q(L)$, $Y_I(L)$ from each Lth finger are combined after being scaled in accordance with the product of the values of FNGR_STRN(L) and COMB(L). This latter multiplication can be done internally or externally to the combiner. If an external module is used for this purpose, the combiner will be supplied with only one scaling factor per sample stream pair.

The baseband processing block 160 processes the baseband sample streams 10I,10Q produced by the diversity combiner 150 and a voice or data signal is delivered to the user. Also, as previously discussed, the power control subchannel decoder within the baseband processing block also decodes power control messages in the baseband sample streams 10I,10Q and delivers them to the control unit 90 in the form of a REV_PWR_CTRL parameter. In the reverse-link direction, the baseband processing block 160 delivers the reverse-link baseband data streams 12I,Q to the transmit modulator. The reverse-link baseband data streams 12I,Q contain encoded voice and/or data from the user as well as power control messages received from the control unit 90 and destined for the base station.

Operation of the control unit 90 is now discussed. Firstly, it is shown how the control unit 90 generates the FWD_PWR_CTRL parameter. Specifically, the control unit 90 receives the $L_{TOT}$ values of the FNGR_STRN(L) parameter from the $L_{TOT}$ fingers. These values are multiplied by the corresponding value of the COMB(L) parameter, whose generation will be described hereinbelow. The products so generated are summed and the sum is accumulated over a given period (e.g., 1.25 ms as in IS-95) and the accumulated value is then compared with a threshold PWR_CTRL_THR that depends on the value of the SPEED parameter and can be extracted. from a look-up table indexed accordingly. It is recalled that the SPEED parameter may be measured by the speed estimator 60 or it may be decoded by the baseband processing block 160.

The FWD_PWR_CTRL parameter is then given a value dependent on the difference between the just mentioned accumulated value and the value of PWR_CTRL_THR. The FWD_PWR_CTRL is suitably a binary signal that instructs the base station to increase or decrease the transmit power by a predetermined step size or a multi-bit signal with a value proportional to the difference between the accumulated value and PWR_CTRL_THR. As previously discussed, the value of FWD_PWR_CTRL is then sent back to the base station, which will increase (decrease) the transmitted power if the FWD_PWR_CTRL is negative (positive), i.e., if the accumulated value is less (greater) than the value of PWR_CTRL_THR.

Alternatively, rather than calculating the received strength by linearly combining the received finger strengths, any other type of intermediate power control criterion that is a monotonic function of frame error rate or bit error rate can be used to compare with PWR_CTRL_THR. Those skilled in the art will appreciate that as long as PWR_CTRL_THR is generated as a function of the value of SPEED, it remains within the scope of the invention.

Next, it is shown how the control unit 90 generates the REV_LNK_GAIN parameter. The value of REV_LNK_GAIN is generated by the control unit.90 based, in general, on one or a combination of the following factors: (i) received total signal power obtained by a power detector in the receiver (not shown); (ii) a configuration signal received from the base station; and (iii) closed loop power control signals received in the power control subchannel from the base station which are decoded in the baseband processing block 160 and sent to the control unit in the form of the REV_PWR_CTRL signal. Ways of using the above-identified factors to generate REV_LNK_GAIN are well known and defined in the standards and do not require further explanation.

The method used to generate the REV_PWR_CTRL signal at the base station can be either a conventional method or an improved method using speed information. In the latter case, the value of REV_PWR_CTRL as sent by the base station is calculated by the base station as a function of the SPEED of the mobile unit by means of a look-up table or an analytical expression in much the same way as described earlier for generating FWD_PWR_CTRL at the mobile unit.

It is now undertaken to discuss how the control unit 90 generates the finger update parameters ASGN_PATH_DLAY(L) and COMB(L) based on the parameters SPEED, PATH_STRN(M), PATH_DLAY(M), FNGR_DLAY(L) and FNGR_STRN(L), for M=1,2, . . . , $M_{TOT}$ and L=1,2, . . . , $L_{TOT}$. It will be appreciated that the update algorithm can be executed by means of a finite state machine or a fuzzy logic algorithm running on the control unit 90.

For ease of understanding, each of the $L_{TOT}$ fingers is assumed to be associated with a triplet of properties that can vary in time. The first property, which can have the value "occupied" or "unoccupied", identifies whether a finger is assigned to a path for demodulation. The second property, which can have the value "to-lock", "locked" or "unlocked", identifies whether a finger is in process of initial acquisition, has successfully acquired the assigned path or has lost lock after successful acquisition. Finally, the third property, which can have the value "enabled" or "disabled", determines whether or not the finger is allowed to be combined in the diversity combiner 150.

There are only five possible distinct triplets, or "states", which can be associated with a given finger. For instance, an "occupied" finger can be in the state of "to-lock", "locked" or "unlocked", while a "locked" finger can be either "enabled" or "disabled". Obviously, a "to-lock" or "unlocked" finger is always disabled, while an "unoccupied" finger is always "unlocked" and "disabled". In sum, the five possible finger states are: "occupied-locked-enabled", "occupied-locked-disabled", "occupied-unlocked-disabled", "occupied-to-lock-disabled" and "unoccupied-unlocked-disabled". Before a call is set up, all the fingers are in the "unoccupied-unlocked-disabled" state. In each of the following steps, it is implied that whenever a finger L is in the "occupied-locked-enabled" state, the corresponding value of COMB(L) is set to have a value 1, otherwise it is set to have the value 0. The following steps are executed by the control unit 90 continuously throughout a call to update the finger states. That is to say, each time the searcher 70 provides a new result of PATH_STRN(1) . . . (M) and PATH_DLAY(1) ... (M), the steps of (A) through (J) below should be executed.

(A) The control unit 90 accepts PATH_STRN(M) and PATH_DLAY(M) from the searcher 70 and accumulates PATH_STRN(M) over a time period $T_A$ determined by the value of SPEED, preferably via a look-up table. The accumulated value is normalized by being divided by $T_A$, producing an internal parameter called AVRG_PATH_STRN(M). The value of AVRG_PATH_STRN(M) is compared with a threshold value $H_{ASSIGN}$, the value of which is also dependent on the value of SPEED, and if it is greater than $H_{ASSIGN}$, this Mth path and its corresponding delay PATH_DLAY(M) are inserted into a "candidate path list".

(B) If there are fingers in the "occupied-locked-enabled", "occupied-locked-disabled", "occupied-to-lock-disabled" or "occupied-unlocked-disabled" state, then the corresponding FNGR_DLAY(L) is compared to PATH_DLAY(j), for each jth path in the candidate path list. If the difference is minimal, e.g., within ⅓ of a chip period, the corresponding candidate path j is removed from the candidate path list.

(C) For each pair of fingers L1,L2 in the "occupied-locked-enabled" or "occupied-locked-disabled" states, the value of FNGR_DLAY(L1) is compared!to the value of FNGR_DLAY(L2). If the difference in their values is minimal, e.g., within ⅓ of a chip period, then one of the fingers (say L1) is put in the "unoccupied-unlocked-disabled" state.

(D) The paths in the candidate path list (if there are any left) are ordered from the strongest to the weakest based on the value of AVRG_PATH_STRN(j) for each jth path in the list. The strongest paths in the candidate path list are assigned to fingers in the "unoccupied-unlocked-disabled" state (if any) by setting ASGN_PATH_DLAY (L) of the Lth such finger equal to the corresponding PATH_DLAY(j) of the jth such strongest path. The fingers so assigned enter the "occupied-to-lock-disabled" state, and a timer is started for each finger upon entering this state. This timer has an expiry period $T_B$, where the value of $T_B$ is determined as a function of SPEED. The paths so assigned are removed from the candidate path list.

(E) For each finger in the "occupied-to-lock-disabled", "occupied-unlocked-disabled", "occupied-locked-disabled" or "occupied-locked-enabled" state, the value of FNGR_STRN(L) of the corresponding Lth finger is accumulated over a time period $T_C$, which can be found in a look-up table indexed according to possible values for the parameter SPEED, and normalized by dividing by $T_C$, thereby producing an internal parameter called AVRG_FNGR_STRN (L).

(F) For each Lth finger in the "occupied-unlocked-disabled" or "occupied-to-lock-disabled" state, the value of AVRG_FNGR_STRN (L) is compared to a threshold value $H_{LOCK}$, which can be extracted from a look-up table indexed according to possible values for SPEED. If the value of AVRG_FNGR_STRN(L) is greater than $H_{LOCK}$, then this finger enters the "occupied-locked-disabled" state. If the value of AVRG_FNGR_STRN(L) is less than $H_{LOCK}$, it remains in its original state until the timer expires after time $T_B$, whereupon the finger enters the "unoccupied-unlocked-disabled" state.

(G) For each Lth finger in the "occupied-locked-disabled" state, if the value of AVRG_FNGR_STRN(L) is greater than a threshold $H_{COMB\_HIGH}$, the finger enters the "occupied-locked-enabled" state; if it is not greater than $H_{COMB\_HIGH}$ but is greater than a threshold $H_{COMB\_LOW}$ for more than a duration $T_D$, then the finger enters the "occupied-locked-enabled" state; if it is less than $H_{LOCK}$, then the finger enters the "occupied-unlocked-disabled" state. Otherwise, the finger remains in the "occupied-locked-disabled" state. The values of $H_{COMB\_HIGH}$, $H_{COMB\_LOW}$ and $T_D$ are dependent on the value of SPEED and can be extracted from respective look-up tables.

(H) For each Lth finger in the "occupied-locked-enabled" state if the value of AVRG_FNGR_STRN(L) is less than the threshold $H_{LOCK}$, then this finger enters the "occupied-unlocked-disabled" state. If the value of AVRG_FNGR_STRN(L) is greater than the threshold $H_{LOCK}$, but is less than a threshold $H_{DISABLE}$, again dependent on the value of SPEED, the finger enters the "occupied-locked-disabled" state. Otherwise, it remains in the "occupied-locked-enabled" state.

(I) For the next strongest path in the candidate path list, e.g., the jth path overall, the value of AVRG_PATH_STRN(j) is compared to the value of AVRG_FNGR_STRN(L) of the weakest finger (denoted L) in the "occupied-unlocked-disabled", "occupied-locked-disabled" or "occupied-locked-enabled" state. If it is higher by more than a threshold $H_{DIFF}$ for a duration $T_E$, both of which depend on the value of SPEED, then ASGN_PATH_DLAY(L) is given the value of PATH_DLAY(j). After reassignment, the finger enters the "occupied-to-lock-disabled" state and a timer with expiry time $T_B$ is started, as described in step (D). The path j is removed from the candidate path list.

(J) Step (I) is repeated for the rest of the paths in the candidate path list. If any fingers that were in the "occupied-locked-enabled" state need to be reassigned due to the procedure in step (I), then the total number of such fingers should preferably not exceed half of the total number of fingers in the "occupied-locked-enabled" state before step (I) was executed.

In addition to being used for improving reception at the mobile unit, it is to be appreciated that knowledge of the speed of the mobile unit can also be used to improve base station performance.

Typically, a base station receiver uses multiple antennas, each of which feeds into an array of fingers similar or identical to finger 80L in FIG. 1. Each finger in the array of fingers at the base station can be dedicated to a particular mobile unit or can be dynamically reassignable to track different mobile units as required. The former is the "dedicated finger resource" architecture and the latter is the "pooled finger resource" architecture. Other resources within the base station, e.g., the searcher, can also be designed as either "dedicated" or "pooled" resources.

It is recalled that while coherent fingers are preferred for use in mobile units since the presence of a pilot channel is guaranteed by both IS-95 and 3G CDMA, such a pilot signal, although proposed for use in 3G CDMA, is absent from IS-95 CDMA. Therefore, many products rely on non-coherent detection techniques for IS-95 CDMA, while for 3G CDMA base stations, coherent detection is usually used to take advantage of the presence of a pilot in the reverse link signal.

One example of an improved method and apparatus for detection of a CDMA signal without a pilot is disclosed in U.S. patent application Ser. No. 08/606,240, entitled "Signal Demodulation and Diversity Combining in a Communications System Using Orthogonal Modulation", incorporated by reference herein. This type of detection, in which the carrier phase is estimtaed for detecting signals which are orthogonally modulated but do not comprise a pilot channel, is sometimes referred to as pseudo-coherent detection.

Many improvements to mobile unit performance provided by the availability of speed information are also applicable to the performance of base stations using dedicated finger resources, wherein a speed estimate is available at the base station for each mobile unit. For example, improvements are obtained by varying the time constant of each loop filter and by varying the accumulation period of the accumulators in each phase estimator and CSI estimator as a function of the estimated speed of the respective mobile unit. Furthermore, improvements similar to those discussed in the context of a mobile unit are also obtained at the base station by rendering the closed loop power control algorithm, as well as the finger assignment and combining algorithm adaptive to the estimated speed of each mobile unit.

In certain situations, base station performance can be improved even further by optimizing the allocation of the finger and searcher resources as a function of speed. Specifically, for a base station utilizing pooled resources, speed information can be used to optimize the allocation of finger resources so that users travelling in a speed range liable to result in poor performance are assigned more fingers to compensate for the loss due to the speed. Also, speed information can be used to optimize the searcher resources so that, for fast moving users, more resources are allocated so as to speed up searching operation and achieve better combining efficiency.

In still other scenarios, performance of the base station can be improved by using multiple finger types and switching or weighting between them. For example, it is possible that in certain mobile speed ranges, non-coherent detection or differential detection may outperform pseudo-coherent or even coherent detection. The likelihood of this occurring is a function of the speed range and frequency band supported by the base station and the mobile CDMA receiver, of the CDMA signal definition (e.g., inclusion or not of a pilot and, if so, the relative plot strength) and of the signal-to-interference ratio targeted by the system. It may therefore be desirable for the base station or even the mobile unit to comprise both coherent (or pseudo-coherent) and non-coherent fingers, as well as two diversity combiners.

In the latter case, switching between the baseband data stream pairs output by the two combiners can be based on the speed estimates produced by the speed estimator for that mobile unit. As an alternative to a switch, a weighted combiner can be used to combine the pseudo-coherent diversity combiner output and the non-coherent diversity combiner output. The weighting factors could be selected as a function of the estimated speed of the mobile unit, possibly using a look-up table located within the base 'station control unit.

Similar to what was described with reference to FIG. 1 for the mobile units, a plurality of speed estimators used for adapting the various base station components can be implemented in the base station receiver for measuring the speed of each mobile unit with which it is communicating.

Further system-level performance improvements can be realized by changing the energy of the pilot channel relative to the energy of the other code channels as a function of mobile unit speed, through adjusting the gain of the pilot channel and/or through changing the time during which the pilot is transmitted. The scaling of the pilot energy can be effected by the mobile unit based on the speed of the mobile unit (in 3G CDMA), or even at the base station based on the maximum speed of the mobile units that the base station is communicating with (in IS-95 and 3G CDMA). Specifically, in the former case, the desired value of the relative pilot energy can be set autonomously at the mobile unit or at the base station, or it can be determined through feedback messages between the two parties.

Moreover, in certain 3G standards proposals, the data channel has a mode of operation in which the data transmission rate is chosen through negotiation. The data transmission rate is determined by various factors, including the traffic load level that already exists in the cell and the quality of service (QoS) requirement of the new and the existing channels. Ideally, the new channel to be added should not cause an unacceptable increase in interference to the existing users. To satisfy a given bit error rate criterion, the interference level introduced by any user from the point of view of any other user is dependent not only on the data rate, but also on the speed of the mobile unit. Inclusion of mobile speed information as a factor for data transmission rate negotiation leads to an improvement in the overall network reliability and capacity.

It is also within the scope of the present invention to set the length of the interleaver and deinterleaver in the baseband processing block in the mobile unit and/or base station as a function of mobile unit speed. In a fading channel, given mobile speed, the longer the interleaver, the better the performance (in terms of deinterleaver gain obtained together with decoding); on the other hand, given the performance (in terms of deinterleaver gain obtained together with decoding), a lower speed requires the use of a longer interleaver/deinterleaver. A longer delay will be tolerated to varying degrees, depending on the type of data or voice service being delivered. It follows that it is most desirable to negotiate the interleaver length for services immune to delay (e.g., supplemental channel) based on the mobile speed.

Specifically, a preferred method of negotiating the interleaver/deinterleaver delay is as follows: Upon obtaining the SPEED parameter from the speed estimator (either at the base station or at the mobile unit), the base station and the mobile unit agree on the interleaver length and the time at which to start using the new length (where applicable), by means of a control channel. At the agreed-upon time, the transmitter switches to the new interleaver length, and the receiver begins using the new. deinterleaver length. The negotiation can be effected before the data channel is set up or during the transmission of data.

Furthermore, speed information may be used to decide whether the mobile is handled by micro cells (e.g., 500 meter radius) or an overlay macro cell (e.g., 5 km radius). Preferably, low mobile unit speeds would result in the system controller and switch resorting to the use of micro cells, while higher speeds would result in the use of an overlay macro cell.

Finally, those skilled in the art will also appreciate that the usefulness of obtaining an estimate of the mobile unit speed extends to police as well as search and rescue operations.

A wide variety of known speed estimators can be used to obtain a reliable estimate of the mobile unit speed, although it is preferred to use one of the several that are now described, depending on whether a pilot channel is present or absent or on whether orthogonal modulation is used at the transmitter.

Figure 3A:
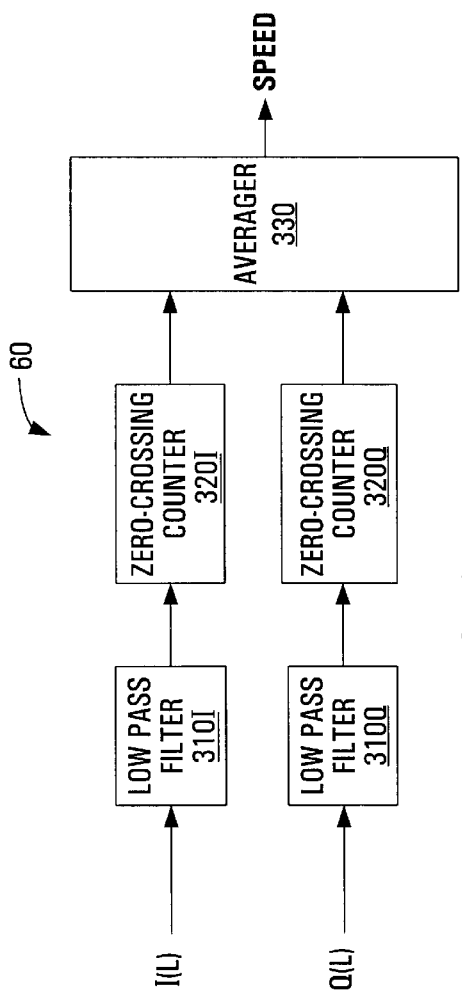
FIG. 3A is a block diagram of a speed estimator for use in a mobile unit or base station designed to receive a pilot channel, such as the mobile unit of FIG. 1.

In FIG. 3A is shown a block diagram of a speed estimator 60 suitable for use in a mobile unit or base station designed to receive a pilot channel, e.g., the mobile unit shown in FIG. 1. The speed estimator 60 comprises a pair of low-pass filters 310I,Q for low-pass filtering the Lth in-phase and quadrature despread sample streams I(L),Q(L). The low-pass filters 310I,Q are connected to respective zero-crossing counters 320I,Q which have respective outputs connected to an averager 330.

The output of the averager 330 is the required speed estimate parameter, denoted SPEED, which is fed to the control unit 90 (in FIG. 1) and which is also fed to the phase estimator, to the CSI estimator and back to the PN code despreader in each finger. Optionally, for increased accuracy of the speed estimate, the in-phase and quadrature despread sample streams from the PN code despreaders in the $L_{TOT}-1$ other fingers may enter corresponding pairs of low-pass filters and zero-crossing counters, the outputs of which may also enter the averager 330.

In order to understand operation of the speed estimator 60, it is to be appreciated that the despread in-phase and quadrature sample streams arriving at the speed estimator from each finger contain the pilot and code channels destined for the mobile unit 10 and having distinct multipath delays corresponding to the multipath delay being tracked by that finger.

Typically, the pilot channel will appear as a strong low frequency component while the code channels will appear as a noise-like signal with a bandwidth dependent on the data rate. With this in mind and with additional reference to FIG. 3A, it can be appreciated that by eliminating the high frequency interference using low-pass filters 310I,Q (for the Lth finger), a relatively low frequency component remains at the input to the zero-crossing counters 320I,Q, corresponding to the real and imaginary parts of the pilot DC multiplied by the fading channel complex gain together with the low frequency portion of the interference.

The maximum Doppler spread (which is proportional to the mobile speed) can be estimated from the number of zero crossings counted per unit time by zero-crossing counters 320I,Q. The averager 330 finds the average zero-crossing rate detected by all the zero-crossing counters in the speed estimator 60, giving a more accurate estimate of the maximum Doppler spread of the carrier on the pilot channel. In order to obtain a high signal to noise ratio for accurate speed estimation, the bandwidth of the low-pass filters 310I,Q should be the maximum Doppler spread supported by the CDMA receiver.

As the speed of the mobile unit changes, there will be a corresponding change in the bandwidth of the complex channel gain that is applied to the pilot channel, which is perceived as a corresponding change in the average number of zero crossings per unit time as output by the averager 330. Therefore, the parameter SPEED as output by the speed estimator 60 in FIG. 3A will indeed be monotonically related to the speed of the mobile unit.

Figure 3B:
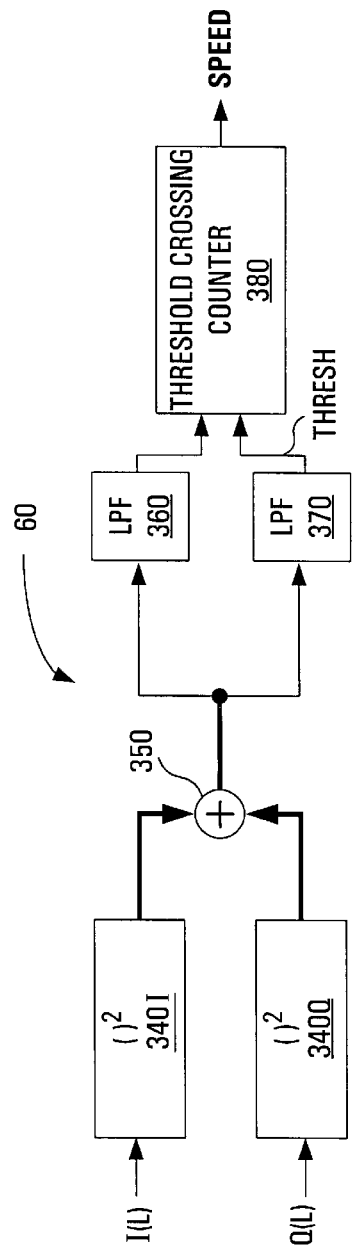
FIG. 3B is a block diagram of a speed estimator for use with a mobile unit or base station which may or may not be designed to receive a pilot channel.

FIG. 3B shows an alternative embodiment to FIG. 3A, which can be used when a pilot is present but also when it is absent, as is the case in the IS-95A reverse link. In FIG. 3B, the speed estimator 60 is seen to comprise squarers 340I,Q for accepting the despread in-phase and quadrature sample streams I(L),Q(L) from the PN code despreader 100L in the Lth finger. Each squarer 340I,Q squares each of elements in the respective sample stream and outputs the squared values to a summer 350. The output of the summer is connected to two low-pass filters 360,370. The low-pass filters are both connected to a threshold crossing counter 380 which outputs the value of the SPEED parameter.

Preferably, one of the low-pass filters has a much narrower bandwidth than the other one. In this case, the bandwidth of low-pass filter 360 is preferably equal to the maximum Doppler spread that can be supported by the CDMA. receiver, while low-pass filter 370 is chosen to have the much narrower bandwidth. The threshold crossing counter 380 determines the number of times that the output of low-pass filter 360 exceeds the value "thresh" as output by low-pass filter 370. The operations performed by the elements of the speed estimator 60 in FIG. 3B can be replicated for each one of a plurality of fingers and associated multipath paths and therefore it may be desirable to take an average value of the speed over all paths by feeding the SPEED parameter from each threshold crossing counter to an averager and using the output of the averager as the value of SPEED.

If the speed estimator in FIG. 3B is used, then the threshold crossing counter 380 effectively determines the number of times that the received instantaneous signal power (i.e., the magnitude of the complex channel gain as calculated by the squarers 340I,Q and the summer 350) in the tracked path of the Lth finger exceeds the average value signal power in the tracked path (represented by the value "thresh" supplied by low-pass filter 370). Again, it is seen that the SPEED parameter output by the threshold crossing counter 380 is directly related to the speed of the mobile unit.

It is to be noted that in either case, upon initial setup of a new call, the speed estimator cannot immediately provide a speed estimate until sufficient zero crossings are counted. During this period, the speed estimator outputs a coded value for SPEED signifying "speed not available". Whenever a device adaptive to speed receives a SPEED value of "speed not available", it assumes a robust, default value (usually the worst-case value) for the parameter SPEED, e.g., when a phase estimator receives the SPEED value of "speed not available", it initially assumes that the mobile unit is moving at the highest speed supported by the CDMA receiver.

Figure 4A:
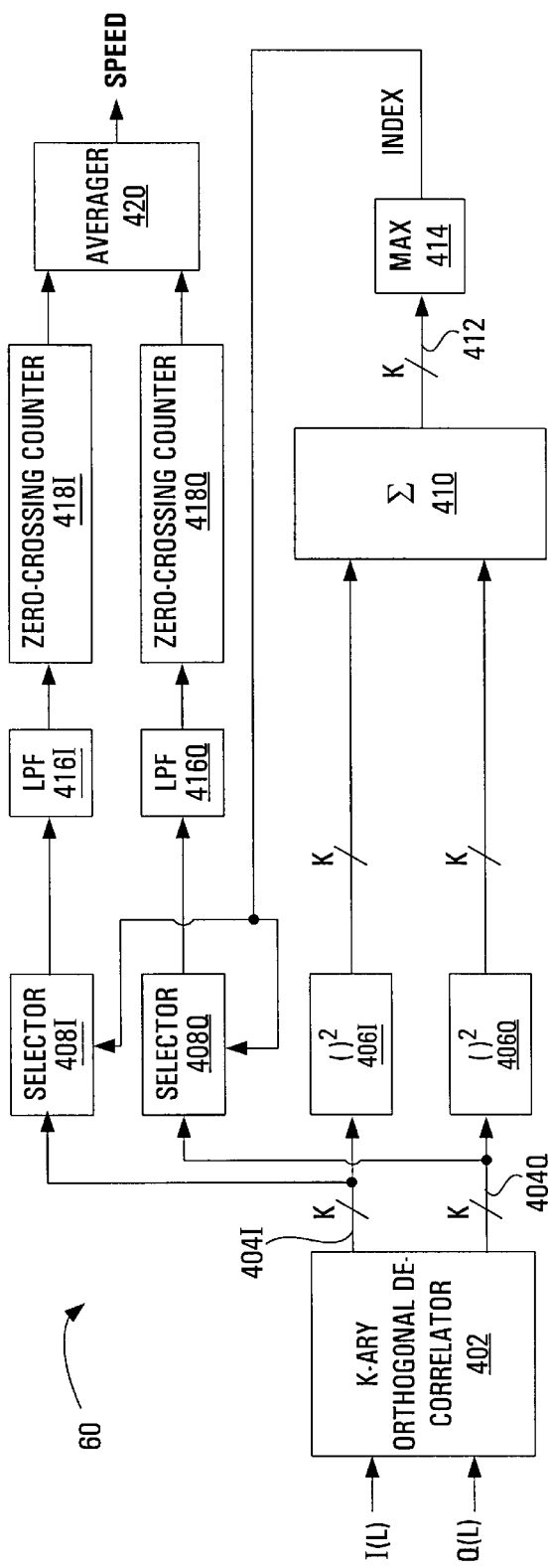
FIG. 4A is a block diagram of a speed estimator for use in a mobile unit or base station designed to receive orthogonally modulated traffic channels.

Reference is now made to FIG. 4A, which depicts a speed estimator 60 which can be employed in a CDMA receiver for detecting the speed of a mobile unit, for CDMA signals using K-ary orthogonal modulation. The speed estimator 60 comprises a K-ary orthogonal de-correlator 402 for accepting the despread in-phase and quadrature sample streams I(L),Q(L) from a PN code despreader located in an Lth finger. In the case of IS-95 CDMA, the de-correlator 402 preferably performs a 64-ary Walsh transform on the despread sample streams, thereby to produce two vectors 404I,Q, each made up of 64 or, more generally, K elements.

Vectors 404I,Q are submitted to respective squarers 406I,Q and respective selectors 408I,Q. Each squarer 406I,Q individually squares each of the K elements in the respective vector 404I,Q and provides K-element vectors of squares to a summer 410. The summer 410 adds the resultant vectors of squares on an element-by-element basis, yielding a K-element composite vector 412. The summer 410 provides the K-element composite vector 412 to a maximum detector 414, which determines the index of the largest element within the K-element composite vector 412.

The maximum detector 414 is connected to the selectors 408I,Q and the index determined by the maximum detector selects the one element of each vector 404I,Q which is to be passed by the respective selector 408I,Q. The output of each selector 408I,Q is connected to a respective low-pass filter 416I,Q, which are respectively connected to zero-crossing counters 418I,Q. Preferably, the bandwidth of lowpass filters 416I,Q is equal to the maximum Doppler spread that can be supported by the CDMA receiver.

The zero-crossing counters strive determine the frequency of variation of the signal having the strongest correlation with a particular Walsh code. Typically, this will give an estimate of the speed with which the fading channel complex gain is changing, which is related to the speed of the mobile unit. The average of the outputs provided by the zero-crossing counters 418I,Q is taken by an averager 420 connected thereto.

For increased accuracy, it may be desirable to provide a K-ary orthogonal de-correlator, as well as pairs of squarers, selectors, low-pass filters and zero-crossing counters for each of $L_{TOT}$ fingers that serve the same mobile unit. The output of the $L_{TOT}$ squarers would enter the same summer 410. The maximum detector would feed the same index to the $^2 \times L_{TOT}$ selectors, and the outputs of the $^2 \times L_{TOT}$ zero-crossing counters would enter the same averager 420. It should be understood that multiple speed estimators are required in order to track the speed of multiple mobile units that the base station is communicating with.

Figure 4B:
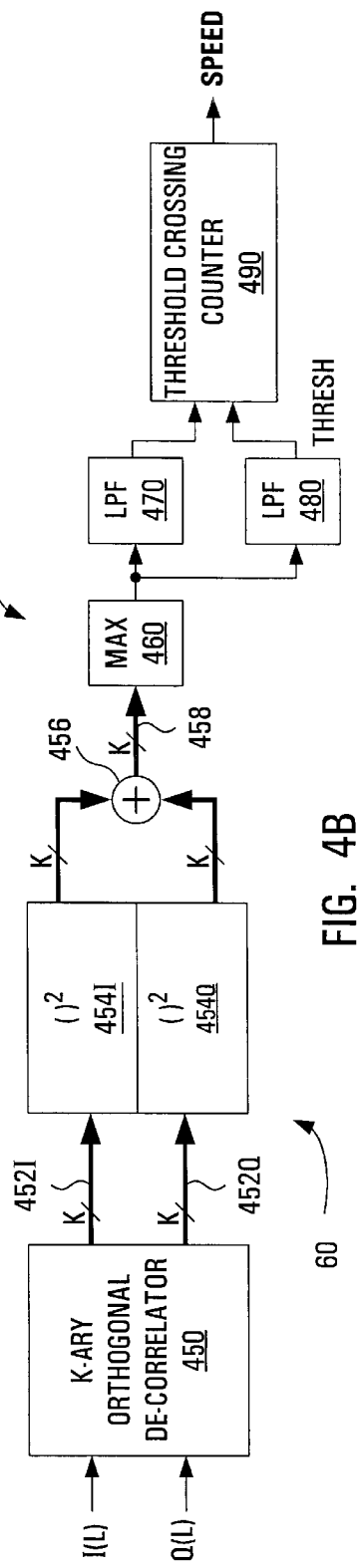
FIG. 4B is an alternative embodiment of FIG. 4A.

FIG. 4B shows a speed estimator 60 which is an alternative to the speed estimator in FIG. 4A, and which would be used under the same conditions. The speed estimator 60 in FIG. 4B comprises a K-ary orthogonal de-correlator 450 for accepting the despread in-phase and quadrature sample streams I(L),Q(L) from a PN code despreader in an Lth finger. In the case of IS-95 CDMA, the de-correlator 450 preferably performs a 64-ary Walsh transform on the despread sample streams, thereby to produce two vectors 452I,Q, each made up of 64 or, more generally, K elements.

Vectors 452I,Q enter respective squarers 454I,Q, whose outputs enter a summer 456. Each squarer 454I,Q squares each of K elements in the respective vector 452I,Q. The summer 456 adds the resultant vectors of squares on an element-by-element basis, yielding a composite vector 458. The output of the summer 456 is connected to a maximum detector 460, which is in turn connected to two low-pass filters 470,480. The lowpass filters are both connected to a threshold crossing counter 490 which produces the parameter SPEED which is an estimate of the relative speed of the mobile unit associated with the Lth finger. At the maximum detector 460, the largest element in the composite vector 458 is selected and output to the low-pass filters 470,480.

Preferably, one of the low-pass filters has a much narrower bandwidth than the other one. In this case, low-pass filter 480 is chosen to have the much narrower bandwidth. The output of low-pass filter 480 is used by the threshold crossing counter 490 as a threshold, and is appropriately denoted "thresh" in FIG. 4B. The bandwidth of low-pass filter 470 is preferably equal to the maximum Doppler spread that can be supported by the CDMA receiver.

The threshold crossing counter 490 determines the number of times that the output of low-pass filter 470 exceeds the value "thresh" as output by low-pass filter 480. That is to say, the threshold crossing counter 490 effectively determines the number of times that the instantaneous maximum Walsh code correlation that is affected by the fading channel complex gain exceeds its average value (supplied by low-pass filter 480). Hence, the output of the threshold crossing counter 490, namely the SPEED parameter, is indeed an estimate of the speed of the mobile unit.

The operations performed by the speed estimator 60 in FIG. 4B can be replicated for each one of a plurality of fingers and associated multipath paths. It may also be desirable to take an average value of the speed over all paths in the manner described above with reference to the speed estimator 60 in FIGS. 3A and 3B. Moreover, it should be understood that multiple speed estimators are required in order to track the speed of multiple mobile units that the base station is communicating with.

While the preferred embodiment of the present invention has been described and illustrated, it will be apparent to one skilled in the art that numerous modifications and variations are possible. For example, the speed estimators of FIGS. 3A, 3B, 4A and 4B can be improved by replacing the zero-crossing counter (or threshold-crossing counter) with a selective zero-crossing counter (or threshold-crossing counter).

Figure 5:
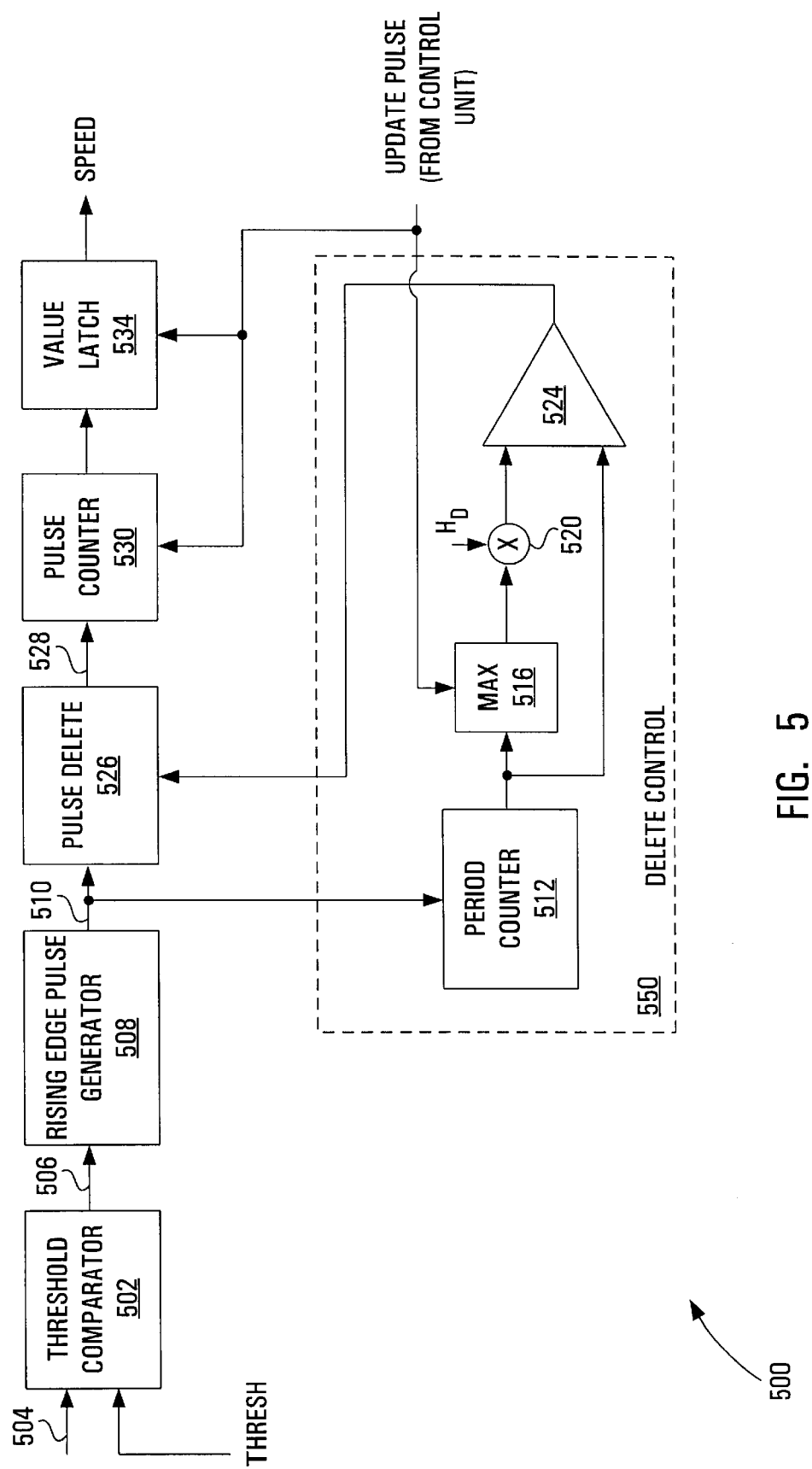
FIG. 5 is a block diagram of a selective zero-crossing counter or threshold crossing counter for use in the speed estimators of FIGS. 3A, 3B, 4A and 4B.

Specifically, FIG. 5 shows a selective threshold-crossing counter 500, comprising a threshold comparator 502 for accepting an input signal 504 and a threshold "thresh". At each system clock interval, the threshold comparator outputs a two-level signal 506 having a first value if the input signal is greater than the threshold "thresh" and a second value otherwise. In order for the selective threshold-crossing counter to behave as a selective zero-crossing counter, the threshold "thresh" can be removed and any internal threshold comparisons performed by the threshold comparator 502 are done against a zero level.

A rising edge pulse generator 508 is connected to the threshold comparator 502 and produces a pulse having a width of one clock cycle every time a rising edge occurs in its input. The output 510 of the rising edge pulse generator is connected to a delete control block 550 and to a pulse delete block 526. The delete control block 550 comprises a period counter 512 connected to a maximum detector 516 and to a comparator 524. The period counter 512 counts the number of system clocks between adjacent pulses in the output 510 of the rising edge pulse generator 508 and outputs the result to the maximum detector 516 and to the comparator 524.

The maximum detector 516 accepts the output of the period counter and determines the maximum value since the beginning of the previous period of length $T_{UPDATE}$. The occurrence of periods of length $T_{UPDATE}$ is signalled by an update pulse received from the control unit located within the receiver. The output of the maximum detector 516 is multiplied by a constant $H_D$ at a scaler 520 and the scaled output is fed to the comparator 524 where it is compared with the output of the period counter 512. The output of the comparator 524, whose operation is described further on, is fed to the pulse delete block 526 in the form of a delete signal.

Depending on the value of the delete signal output by the comparator 524 in the delete control block 550, the pulse delete block 526 deletes or forwards the pulses received from the rising edge pulse generator 508, thereby providing an output 528 to a pulse counter 530. The pulse counter 530 counts the number of pulses since the beginning of the most recent period of length $T_{UPDATE}$ as signalled by the update pulse received from the control unit. The pulse counter 530 feeds the counted number of pulses to a value latch block 534, which latches the value of the output of the pulse counter 530 upon receipt of an update pulse from the control unit, thereby providing the SPEED parameter required by other elements of the CDMA receiver.

In operation, pulses generated by the rising edge pulse generator 508 are either forwarded or deleted by the pulse delete block 526, based on the value of the output of the comparator 524 within the delete control block 550. The purpose of the pulse delete block 526 is to delete those pulses which occur due to noise. By considering operation of the delete control block 550 in greater detail, it will be shown how the output of the comparator 524 is indicative of whether a pulse is likely to have been caused due to noise.

Firstly, it is noted that the period counter produces a stream of values representing the number of clock cycles between pulses generated by the rising edge pulse generator 508. The maximum detector 516 then detects the largest amount of time lapsed between rising edges since the beginning of the previous period of length $T_{UPDATE}$. This maximum gap is scaled by $H_D$, which is preferably in the range of 0.1 to 0.5, and compared at the comparator to the current gap between rising edges.

If the rising edges are close together in relation to the scaled maximum time between rising edges, i.e., if the output of the period counter is less than the output of the scaler 520, then the rising edge is deemed to be caused by noise and the pulse output by the rising edge pulse generator 508 is to be deleted. Accordingly, the output of the comparator 524 instructs the pulse delete block 526 to delete the pulse currently being received from the rising edge pulse generator.

The pulse counter then counts the number of pulses forwarded by the pulse delete block 526, which is possibly reduced from the number of pulses generated by the rising edge pulse generator 508. The value latch block 534 simply latches the output of the pulse counter 530 every time an update pulse is received from the control unit. The update pulse can be generated by the control unit as a multiple of the fixed clock period or, alternatively, the control unit may monitor the output of the pulse counter 530 and produce an update pulse whenever the output of the counter reaches a certain high value. In the latter case, the SPEED parameter output by the value latch block 534 would have to be normalized by $T_{UPDATE}$ in order to maintain monotonicity between the actual speed and the value of the SPEED parameter fed to other elements of the receiver.

In view of the many other conceivable variations of the invention, its scope is only to be limited by the claims appended hereto.

I claim:

1. A despreader connectable to a downconverter located in a communications device used in a cellular system wherein a base station exchanges CDMA signals with mobile units travelling at respective speeds, the despreader being associated with one of the mobile units and comprising:

means for receiving an in-phase downconverted data stream and a quadrature downconverted data stream from the downconverter;

means for receiving an estimate of the speed of the associated mobile unit;

signal processing means for despreading the downconverted data streams in accordance with a plurality of parameters; and means for adapting at least one of the parameters as a function of the estimate of the speed of the associated mobile unit.

2. A despreader according to claim 1, wherein the signal processing means comprises:

a signal conditioning means for multiplying the in-phase downconverted data stream by an in-phase pseudonoise sequence and multiplying the quadrature downconverted data stream by a quadrature pseudonoise sequence and summing the products to produce a despread in-phase sample stream; and for multiplying the quadrature downconverted data stream by the negative of the in-phase pseudonoise sequence and multiplying the in-phase downconverted data stream by the quadrature pseudonoise sequence and summing the products to produce a despread quadrature sample stream; and a tracking loop comprising a delay detector, a loop filter and a pseudonoise sequence delay shifter, for shifting the in-phase and quadrature pseudonoise sequences in accordance with an assigned path delay and autonomously tracking the path delay, wherein the loop filter has at least one parameter adaptable by the means for adapting.

3. A despreader according to claim 2, wherein the means for adapting is a look-up table indexed according to values of the estimate of the speed of the associated mobile unit.

4. A phase estimator connectable to a despreader located in a communications device used in a cellular system wherein a base station exchanges CDMA signals with mobile units travelling at respective speeds, the phase estimator being associated with one of the mobile units and comprising:

means for receiving an in-phase despread data stream and a quadrature despread data stream from the despreader;

means for receiving an estimate of the speed of the associated mobile unit;

signal processing means for estimating the phase of the complex-valued data stream formed by the in-phase and quadrature despread data streams in accordance with a plurality of parameters; and means for adapting at least one of the parameters as a function of the estimate of the speed of the associated mobile unit.

5. A phase estimator according to claim 4, wherein the signal processing means comprises:

an in-phase accumulator for accumulating the in-phase despread sample stream over an accumulation period, wherein said accumulation period is one of the at least one parameter adaptable by the means for adapting;

a quadrature accumulator for accumulating the quadrature despread sample stream over said accumulation period; and a scaler connected to the in-phase and quadrature accumulators, for scaling the magnitude of the complex signal represented by the outputs of the accumulators to a predetermined value.

6. A phase estimator according to claim 4, wherein the signal processing means comprises:

an in-phase accumulator for accumulating the in-phase despread sample stream over an accumulation period, wherein said accumulation period is one of the at least one parameter adaptable by the means for adapting;

a quadrature accumulator for accumulating the quadrature despread sample stream over said accumulation period; and a scaler connected to the in-phase and quadrature accumulators, for scaling the accumulator outputs by the inverse of said accumulation period.

7. A phase estimator according to claim 5, wherein the means for adapting is a look-up table indexed according to values of the estimate of the speed of the associated mobile unit.

8. A phase estimator according to claim 6, wherein the means for adapting is a look-up table indexed according to values of the estimate of the speed of the associated mobile unit.

9. A channel state information (CSI) estimator connectable to a phase corrector located in a communications device used in a cellular system wherein a base station exchanges CDMA signals with mobile units travelling at respective speeds, the CSI estimator being associated with one of the mobile units and comprising:

means for receiving an in-phase data stream from the phase corrector;

means for receiving an estimate of the speed of the associated mobile unit;
signal processing means for measuring the strength of the in-phase data stream in accordance with a plurality of parameters; and
means for adapting at least one of the parameters as a function of the estimate of the speed of the associated mobile unit.

10. A CSI estimator according to claim 9, wherein the signal processing means comprises:
an accumulator for accumulating the in-phase sample stream over an accumulation period, wherein said accumulation period is one of the at least one parameter adaptable by the means for adapting;
a scaler for scaling the accumulator output by the inverse of said accumulation period.

11. A CSI estimator according to claim 10, wherein the means for adapting is a look-up table indexed according to values of the estimate of the speed of the associated mobile unit.

12. A processing finger connectable to a downconverter located in a communications device used in a cellular system wherein a base station exchanges CDMA signals with mobile units travelling at respective speeds, the finger being associated with one of the mobile units and comprising:
a despreader for connection to the downconverter, comprising means for receiving an in-phase downconverted data stream and a quadrature downconverted data stream from the downconverter; means for receiving an estimate of the speed of the associated mobile unit; signal processing means for despreading the downconverted data streams in accordance with a plurality of parameters; and means for adapting at least one of the parameters as a function of the estimate of the speed of the associated mobile unit;
a phase estimator connected to the despreader, comprising means for receiving an in-phase despread data stream and a quadrature despread data stream from the despreader; means for receiving an estimate of the speed of the associated mobile unit; signal processing means for estimating the phase of the complex-valued data stream formed by the in-phase and quadrature despread data streams in accordance with a plurality of parameters; and means for adapting at least one of the parameters as a function of the estimate of the speed of the associated mobile unit; and
a phase corrector connected to the despreader and to the phase estimator, for modifying the phase of the complex-valued data stream formed by the in-phase and quadrature despread data streams in accordance with the negative of the phase estimated by the phase estimator.

13. A processing finger according to claim 12, further comprising a CSI estimator connected to the phase corrector, comprising means for receiving an in-phase data stream from the phase corrector; means for receiving an estimate of the speed of the associated mobile unit; signal processing means for measuring the strength of the in-phase data stream in accordance with a plurality of parameters; and means for adapting at least one of the parameters as a function of the estimate of the speed of the associated mobile unit.

14. A communications device for use in a cellular system wherein a base station exchanges CDMA signals with mobile units travelling at respective speeds, the device comprising, for each mobile unit:
a downconverter for applying downconversion and quadrature demodulation to baseband of a received CDMA signal, thereby to produce a baseband in-phase sample stream and a baseband quadrature sample stream;
a searcher connected to the downconverter, for identifying the strongest multipath path delays present in the baseband in-phase and quadrature sample streams;
at least two processing fingers connected to the downconverter, each finger comprising:
means for receiving an estimate of the speed of the mobile unit;
means for tracking and measuring the delay associated with the respective finger in accordance with a respective assigned finger delay and the estimate of the speed of the mobile unit, thereby to produce a tracked and measured finger delay;
means for measuring the strength of the respective finger in accordance with the estimate of the speed of the mobile unit; and
means for despreading the baseband in-phase and quadrature sample streams in accordance with the respective tracked and measured finger delay, thereby to produce a respective despread in-phase data stream and a respective despread quadrature data stream;
a diversity combiner connected to the at least two fingers, for scaling the despread in-phase data stream and the despread quadrature data stream received from each finger in accordance with the respective finger strength and a respective combining gain; and
a control unit connected to the searcher, to the at least two fingers and to the diversity combiner, comprising means for receiving the estimate of the speed of the mobile unit and means for determining, for each finger, the respective combining gain and the respective assigned finger delay as a function of: the respective measured finger delay and finger strength, the multipath delays and strengths identified by the searcher and the estimate of the speed of the mobile unit.

15. A communications device according to claim 14, further comprising, for each mobile unit:
a baseband processing block connected to the diversity combiner, for receiving an in-phase data stream and a quadrature data stream from the diversity combiner and converting these into a user-specific signal and for receiving a user-specific signal and converting it into an in-phase baseband data stream and a quadrature baseband data stream for delivery to a transmit modulator;
a transmit modulator connected to the baseband processing block for modulating the baseband data stream received from the baseband processing block into a modulated signal; and
a transmit power control block connected to the transmit modulator and to the control unit, for varying the power of the modulated signal in accordance with a gain parameter received from the control unit.

16. A communications device according to claim 14, further comprising, for each mobile unit, a speed estimator for providing the estimate of the speed of the associated mobile unit and wherein the speed estimator comprises:
first and second low-pass filters for respectively filtering the baseband in-phase sample stream and the baseband quadrature sample stream received from the finger associated with the mobile unit;
first and second zero-crossing counters respectively connected to the first and second low-pass filters for respectively determining the instantaneous frequency of a pilot signal present in the low-pass filtered baseband in-phase and quadrature sample streams;

averaging means connected to the first and second zero-crossing counters, for estimating the speed of the mobile unit by determining the average instantaneous frequency of the pilot signals.

17. A communications device according to claim 14, further comprising, for each mobile unit, a speed estimator for providing the estimate of the speed of the associated mobile unit and wherein the speed estimator comprises:

first and second squaring means for respectively squaring the samples in the baseband in-phase sample stream and the baseband quadrature sample stream received from the finger associated with the mobile unit;

summing means connected to the first and second squaring means, for summing the outputs of the first and second squaring means;

first and second low-pass filters connected to the summing means, the first low-pass filter producing a filtered signal and the second low-pass filter having a bandwidth narrower than the first low-pass filter and producing a threshold; and threshold crossing counter means connected to the first and second low-pass filters for determining the number of times that the filtered signal passes from a value below the threshold to a value that is above the threshold, thereby to produce an estimate of the speed of the mobile unit.

18. A communications device according to claim 14, further comprising, for each mobile unit, a speed estimator for providing the estimate of the speed of the associated mobile unit and wherein the speed estimator comprises:

an orthogonal de-correlator for applying a K-ary orthogonal transform to the baseband in-phase sample stream received from the finger associated with the mobile unit, thereby to produce a K-element in-phase vector, and for applying said orthogonal transform to the baseband quadrature sample stream received from said finger associated with the mobile unit, thereby to produce a K-element quadrature vector;

first and second squaring means connected to the orthogonal de-correlator, for squaring each element in the K-element in-phase vector and the K-element quadrature vector, respectively;

summing means connected to the first and second squaring means, for summing the elements of the squared in-phase and quadrature vectors, thereby to produce a K-element vector of summed squares;

a maximum detector connected to the summing means, for selecting the index of the largest element of the K-element vector of summed squares;

first and second selectors connected to the orthogonal de-correlator and to the maximum detector, for respectively passing the element of the K-element in-phase vector and the element of the K-element quadrature vector identified by the index;

first and second low-pass filters respectively connected to the first and second selectors;

first and second zero-crossing counters respectively connected to the first and second low-pass filters; and an averager connected to the first and second zero-crossing counters, for determining the average of the outputs of the first and second zero-crossing counters, thereby to produce an estimate of the speed of the mobile unit.

19. A communications device according to claim 14, further comprising, for each mobile unit, a speed estimator for providing the estimate of the speed of the associated mobile unit and wherein the speed estimator comprises:

an orthogonal de-correlator for applying a K-ary orthogonal transform to the baseband in-phase sample stream and the baseband quadrature sample stream received from the finger associated with the mobile unit and producing a K-element in-phase vector and a K-element quadrature vector;

first and second squaring means connected to the orthogonal de-correlator, for squaring each element in the K-element in-phase vector and the K-element quadrature vector, respectively;

summing means connected to the first and second squaring means, for summing the elements of the squared in-phase and quadrature vectors, thereby to produce a K-element vector of summed squares;

a maximum detector connected to the summing means, for selecting the largest element of the K-element vector of summed squares;

first and second low-pass filters connected to the maximum detector means, the first low-pass filter producing a filtered signal and the second low-pass filter having a bandwidth narrower than the first low-pass filter and producing a threshold; and threshold crossing counter means connected to the first and second low-pass filters for determining the number of times that the filtered signal passes from a value below the threshold to a value that is above the threshold, thereby to produce an estimate of the speed of the mobile unit.

20. A speed estimator for estimating the speed of a mobile unit, comprising:

first and second low-pass filters for respectively filtering a baseband in-phase sample stream and a baseband quadrature sample stream;

first and second zero-crossing counters respectively connected to the first and second low-pass filters for respectively determining the instantaneous frequency of a pilot signal present in the low-pass filtered baseband in-phase and quadrature sample streams;

averaging means connected to the first and second zero-crossing counters, for estimating the speed of the mobile unit by determining the average instantaneous frequency of the pilot signals.

21. A speed estimator according to claim 20, wherein each of the first and second zero-crossing counters comprises:

a threshold comparator for accepting the input signal and for outputting, at each system clock interval, a two-level signal having a first value if the input signal is greater than zero and a second value otherwise;

a rising edge pulse generator connected to the threshold comparator for producing a pulse having a width of one clock cycle every time a rising edge occurs in its input;

a delete control block comprising: a period counter connected to the rising edge pulse generator, for counting the number of system clocks between adjacent pulses in the output of the rising edge pulse generator; a maximum detector connected to the period counter, for determining the maximum value since the beginning of the previous period, the period having a specifiable length; a scaler connected to the maximum detector, for multiplying the output of the maximum detector by a constant; and a comparator connected to the output of the period counter and to the output of the scaler;

pulse delete circuitry connected to the output of the rising edge pulse generator and to the output of the delete control block, for deleting or forwarding the pulses received from the rising edge pulse generator to its output as a function of the value of the output of the comparator in the delete control block;

a pulse counter connected to the pulse delete circuitry, for counting the number of pulses since the beginning of the most recent period, the period having a specifiable length;

value latch circuitry connected to the pulse counter, for latching the value of the output of the pulse counter upon receipt of an update pulse, thereby to provide an estimate of the speed of the mobile unit.

22. A speed estimator for estimating the speed of a mobile unit, comprising:

first and second squaring means for squaring the samples in a baseband in-phase sample stream and a baseband quadrature sample stream, respectively;

summing means connected to the first and second squaring means, for summing the outputs of the first and second squaring means;

first and second low-pass filters connected to the summing means, the first low-pass filter producing a filtered signal and the second low-pass filter having a bandwidth narrower than the first low-pass filter and producing a threshold; and threshold crossing counter means connected to the first and second low-pass filters for determining the number of times that the filtered signal passes from a value below the threshold to a value that is above the threshold, thereby to produce an estimate of the speed of the mobile unit.

23. A speed estimator according to claim 22, wherein the threshold crossing counter means comprises:

a threshold comparator for accepting the input signal and for outputting, at each system clock interval, a two-level signal having a first value if the input signal is greater than a predetermined threshold and a second value otherwise;

a rising edge pulse generator connected to the threshold comparator for producing a pulse having a width of one clock cycle every time a rising edge occurs in its input;

a delete control block comprising: a period counter connected to the rising edge pulse generator, for counting the number of system clocks between adjacent pulses in the output of the rising edge pulse generator; a maximum detector connected to the period counter, for determining the maximum value since the beginning of the previous period, the period having a specifiable length; a scaler connected to the maximum detector, for multiplying the output of the maximum detector by a constant; and a comparator connected to the output of the period counter and to the output of the scaler;

pulse delete circuitry connected to the output of the rising edge pulse generator and to the output of the delete control block, for deleting or forwarding the pulses received from the rising edge pulse generator to its output as a function of the value of the output of the comparator in the delete control block;

a pulse counter connected to the pulse delete circuitry, for counting the number of pulses since the beginning of the most recent period, the period having a specifiable length;

value latch circuitry connected to the pulse counter, for latching the value of the output of the pulse counter upon receipt of an update pulse, thereby to provide an estimate of the speed of the mobile unit.

24. A speed estimator for estimating the speed of a mobile unit, comprising:

an orthogonal de-correlator for applying a K-ary orthogonal transform to a baseband in-phase sample stream, thereby to produce a K-element in-phase vector, and for applying said orthogonal transform to a baseband quadrature sample stream, thereby to produce a K-element quadrature vector;

first and second squaring means connected to the orthogonal de-correlator, for squaring each element in the K-element in-phase vector and the K-element quadrature vector, respectively;

summing means connected to the first and second squaring means, for summing the elements of the squared in-phase and quadrature vectors, thereby to produce a K-element vector of summed squares;

a maximum detector connected to the summing means, for selecting the index of the largest element of the K-element vector of summed squares;

first and second selectors connected to the orthogonal de-correlator and to the maximum detector, for respectively passing the element of the K-element in-phase vector and the element of the K-element quadrature vector identified by the index;

first and second low-pass filters respectively connected to the first and second selectors;

first and second zero-crossing counters respectively connected to the first and second low-pass filters; and an averager connected to the first and second zero-crossing counters, for determining the average of the outputs of the first and second zero-crossing counters, thereby to produce an estimate of the speed of the mobile unit.

25. A speed estimator according to claim 24, wherein each of the first and second zero-crossing counters comprises:

a threshold comparator for accepting the input signal and for outputting, at each system clock interval, a two-level signal having a first value if the input signal is greater than zero and a second value otherwise;

a rising edge pulse generator connected to the threshold comparator for producing a pulse having a width of one clock cycle every time a rising edge occurs in its input;

a delete control block comprising: a period counter connected to the rising edge pulse generator, for counting the number of system clocks between adjacent pulses in the output of the rising edge pulse generator; a maximum detector connected to the period counter, for determining the maximum value since the beginning of the previous period, the period having a specifiable length; a scaler connected to the maximum detector, for multiplying the output of the maximum detector by a constant; and a comparator connected to the output of the period counter and to the output of the scaler;

pulse delete circuitry connected to the output of the rising edge pulse generator and to the output of the delete control block, for deleting or forwarding the pulses received from the rising edge pulse generator to its output as a function of the value of the output of the comparator in the delete control block;

a pulse counter connected to the pulse delete circuitry, for counting the number of pulses since the beginning of the most recent period, the period having a specifiable length;

value latch circuitry connected to the pulse counter, for latching the value of the output of the pulse counter upon receipt of an update pulse, thereby to provide an estimate of the speed of the mobile unit.

26. A speed estimator for estimating the speed of a mobile unit, comprising:

an orthogonal de-correlator for applying a K-ary orthogonal transform to a baseband in-phase sample stream and a baseband quadrature sample stream and producing a K-element in-phase vector and a K-element quadrature vector;

first and second squaring means connected to the orthogonal de-correlator, for squaring each element in the K-element in-phase vector and the K-element quadrature vector, respectively;

summing means connected to the first and second squaring means, for summing the elements of the squared in-phase and quadrature vectors, thereby to produce a K-element vector of summed squares;

a maximum detector connected to the summing means, for selecting the largest element of the K-element vector of summed squares;

first and second low-pass filters connected to the maximum detector means, the first low-pass filter producing a filtered signal and the second low-pass filter having a bandwidth narrower than the first low-pass filter and producing a threshold; and threshold crossing counter means connected to the first and second low-pass filters for determining the number of times that the filtered signal passes from a value below the threshold to a value that is above the threshold, thereby to produce an estimate of the speed of the mobile unit.

27. A speed estimator according to claim 26, wherein the threshold crossing counter means comprises:

a threshold comparator for accepting the input signal and for outputting, at each system clock interval, a two-level signal having a first value if the input signal is greater than a threshold "thresh" and a second value otherwise;

a rising edge pulse generator connected to the threshold comparator for producing a pulse having a width of one clock cycle every time a rising edge occurs in its input;

a delete control block comprising: a period counter connected to the rising edge pulse generator, for counting the number of system clocks between adjacent pulses in the output of the rising edge pulse generator; a maximum detector connected to the period counter, for determining the maximum value since the beginning of the previous period, the period having a specifiable length; a scaler connected to the maximum detector, for multiplying the output of the maximum detector by a constant; and a comparator connected to the output of the period counter and to the output of the scaler;

pulse delete circuitry connected to the output of the rising edge pulse generator and to the output of the delete control block, for deleting or forwarding the pulses received from the rising edge pulse generator to its output as a function of the value of the output of the comparator in the delete control block;

a pulse counter connected to the pulse delete circuitry, for counting the number of pulses since the beginning of the most recent period, the period having a specifiable length;

value latch circuitry connected to the pulse counter, for latching the value of the output of the pulse counter upon receipt of an update pulse, thereby to provide an estimate of the speed of the mobile unit.

* * * * *